US012641198B2

(12) United States Patent     (10) Patent No.:   US 12,641,198 B2

Ballagas et al.     (45) Date of Patent:    May 26, 2026

(54) AVATAR DISPLAY IN SPATIAL CONFIGURATION AND AT ORIENTATION IDENTIFIED ACCORDING TO FOCUS OF ATTENTION

(71) Applicant: Hewlett-Packard Development Company, L.P., Spring, TX (US)

(72) Inventors: Rafael Ballagas, Palo Alto, CA (US); Bianca Rawlings, Fort Collins, CO (US); Richard E. Hodges, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 148 days.

(21) Appl. No.: 18/702,779

(22) PCT Filed: Oct. 27, 2021

(86) PCT No.: PCT/US2021/056810

§ 371 (c)(1),
(2) Date: Apr. 18, 2024

(87) PCT Pub. No.: WO2023/075761

PCT Pub. Date: May 4, 2023

(65) Prior Publication Data

US 2025/0233962 A1     Jul. 17, 2025

(51) Int. Cl.
*H04N 7/15*      (2006.01)
*G02B 27/00*     (2006.01)
(Continued)

(52) U.S. Cl.
CPC ......... *H04N 7/157* (2013.01); *G02B 27/0093* (2013.01); *G02B 27/017* (2013.01);
(Continued)

(58) Field of Classification Search
CPC ...... H04N 7/157; H04N 7/15; G02B 27/0093; G02B 27/017; G02B 27/0179;
(Continued)

(56) References Cited

U.S. PATENT DOCUMENTS 9,100,540 B1    8/2015   Gates et al.
11,710,280 B1 *   7/2023   Durairaj ................. G06V 40/28
                                                  345/419

(Continued)

FOREIGN PATENT DOCUMENTS

TW       202040999 A    11/2020

*Primary Examiner* — Yosef K Laekemariam
(74) *Attorney, Agent, or Firm* — Quarles & Brady LLP

(57) ABSTRACT

A focus of attention of each of a number of remote users participating with a local user in a virtual meeting is received. A spatial configuration of avatars representing the remote users is identified according to the focus of attention of each remote user. An orientation of each avatar in the identified spatial configuration is identified according to the identified spatial configuration and according to the focus of attention of the remote user that the avatar represents. The avatars are displayed in the identified spatial configuration on a display. Each avatar is displayed in the identified spatial configuration on the display at the identified orientation.

15 Claims, 8 Drawing Sheets

(51) Int. Cl.
    *G02B 27/01*         (2006.01)
    *G06F 3/01*          (2006.01)

(52) U.S. Cl.
    CPC ......... *G02B 27/0179* (2013.01); *G06F 3/013*
             (2013.01); *G02B 2027/0187* (2013.01)

(58) Field of Classification Search
    CPC ........... G02B 2027/0187; G02B 27/00; G02B
                27/01; G06F 3/013; G06F 3/01
    See application file for complete search history.

(56)                References Cited

U.S. PATENT DOCUMENTS

| | | |
|---|---|---|
| 2005/0168402 A1 | 8/2005 | Culbertson et al. |
| 2012/0154510 A1 | 6/2012 | Huitema et al. |
| 2012/0274736 A1* | 11/2012 | Robinson ................. H04N 7/15 |
| | | 348/E7.083 |
| 2019/0253667 A1 | 8/2019 | Valli |
| 2020/0327860 A1 | 10/2020 | Chen |

\* cited by examiner

FIG 3

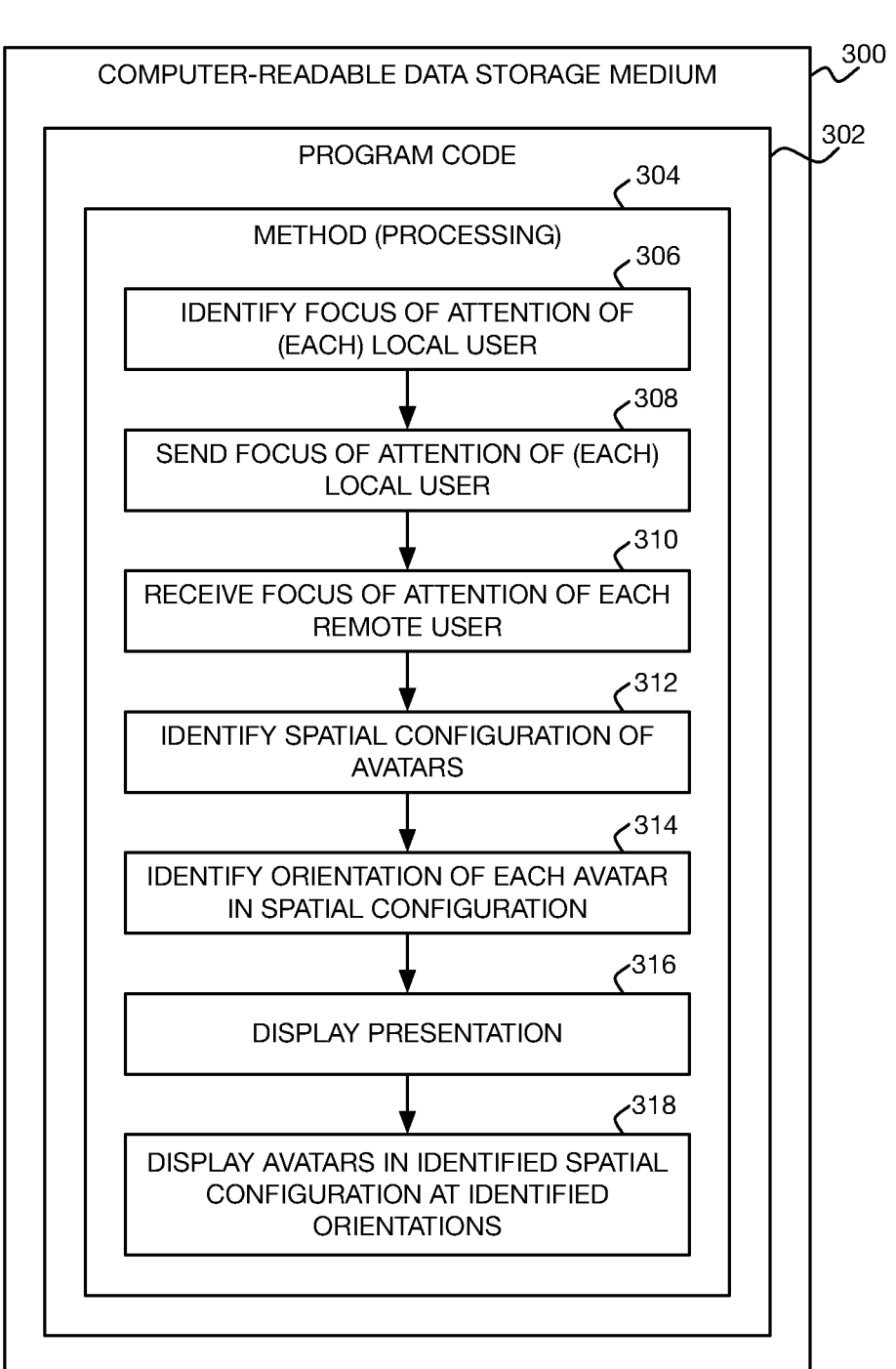

COMPUTER-READABLE DATA STORAGE MEDIUM    300

PROGRAM CODE    302

304

METHOD (PROCESSING)

306

IDENTIFY FOCUS OF ATTENTION OF (EACH) LOCAL USER

308

SEND FOCUS OF ATTENTION OF (EACH) LOCAL USER

310

RECEIVE FOCUS OF ATTENTION OF EACH REMOTE USER

312

IDENTIFY SPATIAL CONFIGURATION OF AVATARS

314

IDENTIFY ORIENTATION OF EACH AVATAR IN SPATIAL CONFIGURATION

316

DISPLAY PRESENTATION

318

DISPLAY AVATARS IN IDENTIFIED SPATIAL CONFIGURATION AT IDENTIFIED ORIENTATIONS

FIG 4

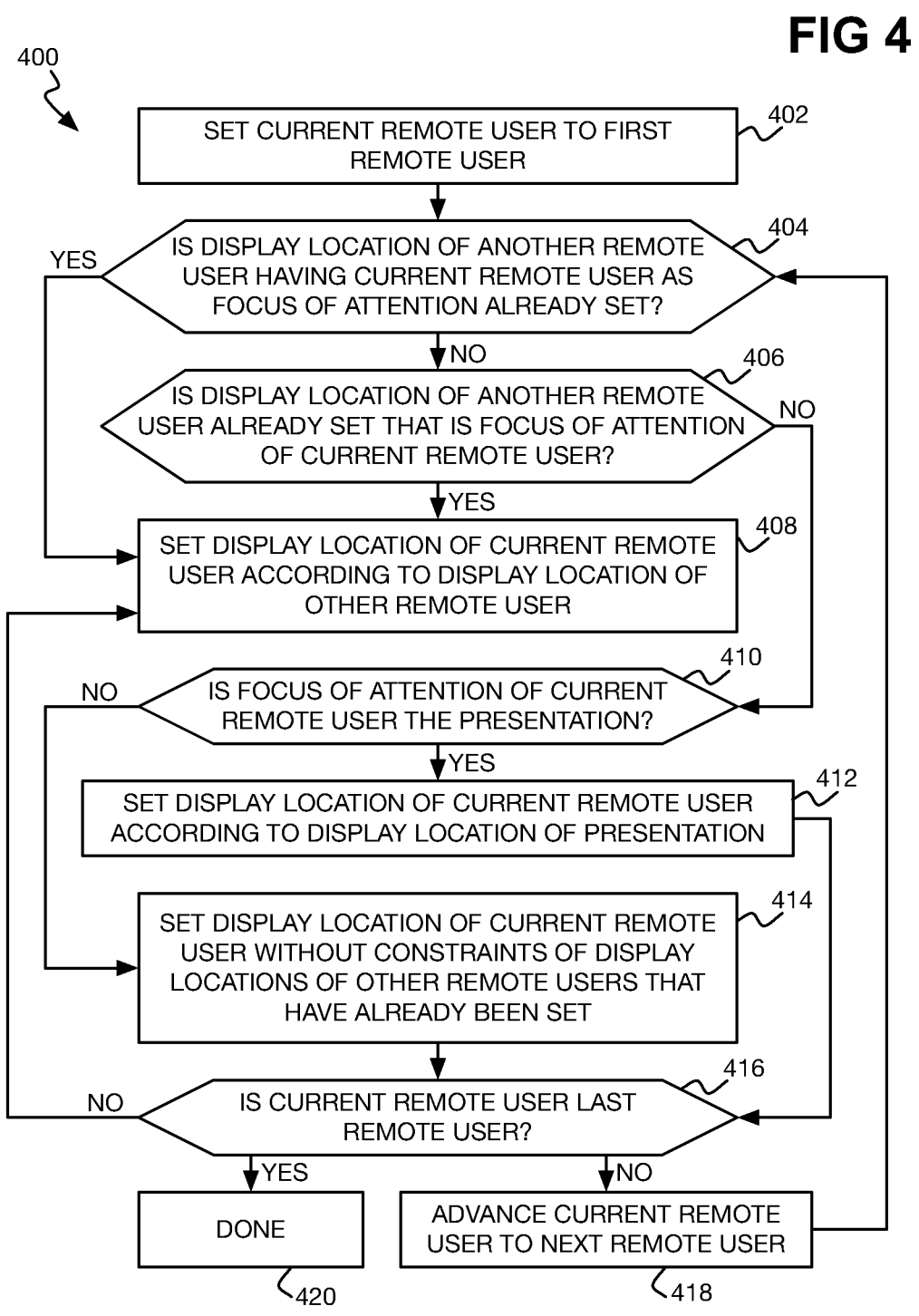

400

SET CURRENT REMOTE USER TO FIRST REMOTE USER ~402

IS DISPLAY LOCATION OF ANOTHER REMOTE USER HAVING CURRENT REMOTE USER AS FOCUS OF ATTENTION ALREADY SET? ~404

YES

NO

IS DISPLAY LOCATION OF ANOTHER REMOTE USER ALREADY SET THAT IS FOCUS OF ATTENTION OF CURRENT REMOTE USER? ~406

NO

YES

SET DISPLAY LOCATION OF CURRENT REMOTE USER ACCORDING TO DISPLAY LOCATION OF OTHER REMOTE USER ~408

IS FOCUS OF ATTENTION OF CURRENT REMOTE USER THE PRESENTATION? ~410

NO

YES

SET DISPLAY LOCATION OF CURRENT REMOTE USER ACCORDING TO DISPLAY LOCATION OF PRESENTATION ~412

SET DISPLAY LOCATION OF CURRENT REMOTE USER WITHOUT CONSTRAINTS OF DISPLAY LOCATIONS OF OTHER REMOTE USERS THAT HAVE ALREADY BEEN SET ~414

IS CURRENT REMOTE USER LAST REMOTE USER? ~416

NO

YES

NO

DONE ~420

ADVANCE CURRENT REMOTE USER TO NEXT REMOTE USER ~418

FIG 5

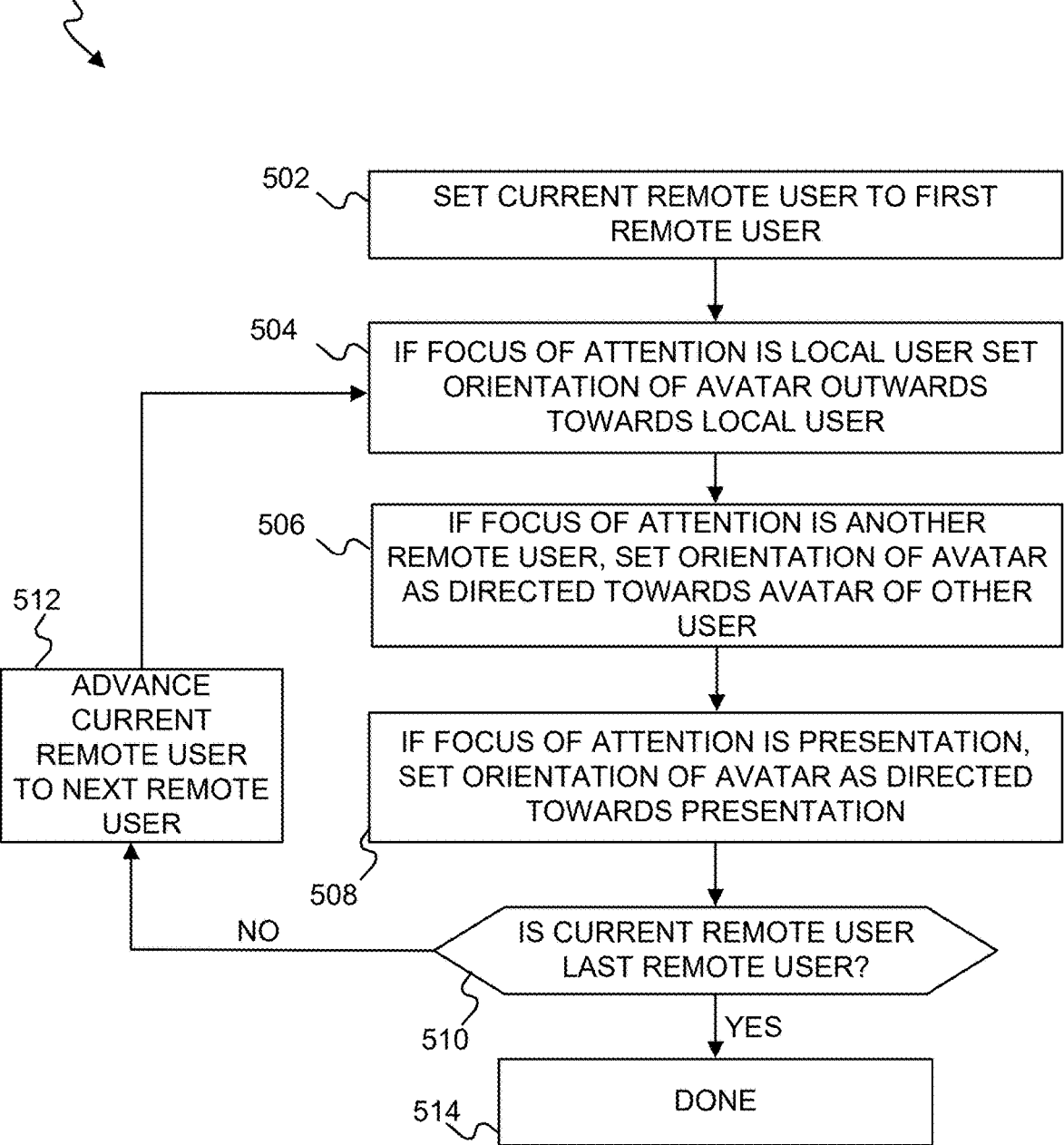

500

502 SET CURRENT REMOTE USER TO FIRST REMOTE USER

504 IF FOCUS OF ATTENTION IS LOCAL USER SET ORIENTATION OF AVATAR OUTWARDS TOWARDS LOCAL USER

506 IF FOCUS OF ATTENTION IS ANOTHER REMOTE USER, SET ORIENTATION OF AVATAR AS DIRECTED TOWARDS AVATAR OF OTHER USER

512 ADVANCE CURRENT REMOTE USER TO NEXT REMOTE USER

IF FOCUS OF ATTENTION IS PRESENTATION, SET ORIENTATION OF AVATAR AS DIRECTED TOWARDS PRESENTATION

508

NO

510 IS CURRENT REMOTE USER LAST REMOTE USER?

YES

514 DONE

AVATAR DISPLAY IN SPATIAL CONFIGURATION AND AT ORIENTATION IDENTIFIED ACCORDING TO FOCUS OF ATTENTION

BACKGROUND

Virtual meetings have become increasingly popular. Virtual meetings allow users at different physical locations to nevertheless participate in a meeting together via computing devices at their respective locations. One or multiple users may be present at each physical location. The users at a specific physical location are referred to as local users, and with respect to this location, and with respect to these users, the users at the other physical locations are referred to as remote users. Users may participate in a virtual meeting using a variety of different computing devices.

For example, one or multiple users may participate in a virtual machine at a dedicated meeting or conference room having a large display, speakers, microphones, and cameras connected to a computing device that is a dedicated meeting device. One or multiple users may participate in a virtual meeting using a more general-purpose computing device, such as a desktop, laptop, or notebook computer, a smartphone, a tablet computing device, or another type of computing device. Individual users may participate in a virtual meeting in an extended reality (XR) technological manner, using head-mountable displays (HMDs).

BRIEF DESCRIPTION OF THE DRAWINGS

FIG. 3 is a diagram of an example non-transitory computer-readable data storage medium storing program code for displaying avatars representing remote users participating in a virtual meeting in a spatial configuration and at orientations according to the focus of attention of each user.

FIG. 4 is a flowchart of an example method for identifying a spatial configuration of avatars representing remote users participating in a virtual meeting according to the focus of attention of each user.

FIG. 5 is a flowchart of an example method for identifying an orientation of the avatar representing each remote user participating in a virtual meeting according to an identified spatial configuration of the avatars and the focus of attention of each user.

DETAILED DESCRIPTION

As noted in the background section, users at different physical locations can participate in a virtual meeting in different ways. Regardless of the way in which the user or users at each physical location participate, however, virtual meetings can induce a type of meeting fatigue that does not usually occur with physical, in-person meetings. This can be because users participating in a virtual meeting are often unable to distinguish the focus of attention of remote users at other physical locations.

For example, when a user participates in a virtual meeting using his or her desktop, laptop, or notebook computer, or other computing device, the other, remote users participating in the virtual meeting are usually displayed on the computer's display looking directly at the user. That is, in a virtual meeting, it is not uncommon that everyone is looking at everyone all the time. Even if a user does not speak once during a virtual meeting, the user is still looking at faces of the other users staring at him or her. By comparison, in a physical, in-person meeting, some users will be looking at the current speaker, other users may be taking notes or looking at the presentation being displayed, and so on.

The inability of a user to distinguish the focus of attention of remote users at other physical locations can result in virtual meetings being more cognitively taxing than physical, in-person meetings. For example, a user spending hours on end in virtual meetings may feel more physically drained at the end of the day than if the user had spent the same length of time in physical, in-person meetings. Therefore, while virtual meetings can improve productivity in that they permit disparately located users to nevertheless meet, such virtual meetings are not without cost that can decrease productivity in other ways.

Techniques described herein ameliorate these and other difficulties. At each physical location at which one or multiple users are participating in a virtual meeting, avatars representing the remote users at the other physical locations are displayed in a spatial configuration and at orientations according to the focus of attention of each user. Each user participating in the virtual meeting is thus more easily able to distinguish the focus of attention of the other users participating in the virtual meeting. Users may therefore be less likely to suffer from cognitive fatigue during virtual meetings.

Figures 1A, 1B, 1C:
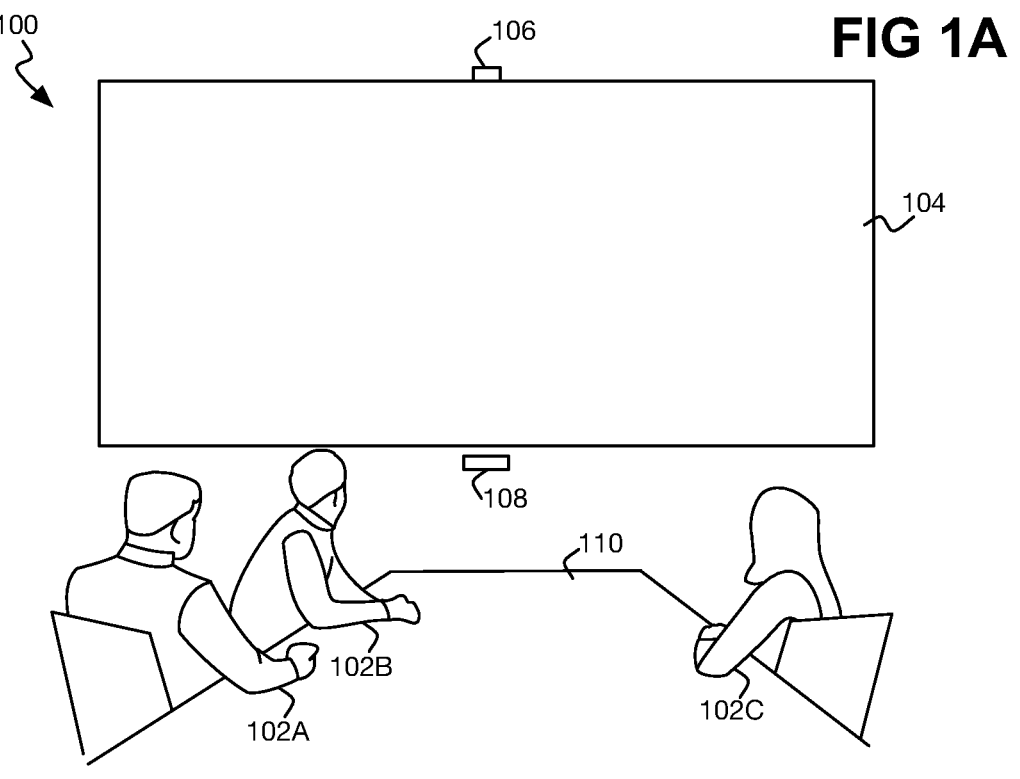
FIGS. 1A, 1B, and 1C are diagrams of different examples as to how users at different physical locations can participate in a virtual meeting.

FIGS. 1A, 1B, and 1C are diagrams of different examples as to how users at different physical locations can participate in the same virtual meeting. In FIG. 1A, the physical location 100 is a meeting room in which three users 102A, 102B, and 102C are participating in the virtual meeting. The users 102A, 102B, and 102C are local users as to the location 100, and are remote users to users at other locations. The users 102A, 102B, and 102C can participate in the virtual meeting with remote users at other locations via a large display 104, a camera 106, and a speaker 108, and the users 102A, 102B, and 102C may sit around a conference table 110 when participating in the meeting. Either the display 104, the camera 106, or the speaker 108 may include a microphone, or there may be an external microphone by which the users 102A, 102B, and 102C also participate in the virtual meeting. These hardware components may be considered part of or communicatively connected to a meeting device at the location 100, such as a dedicated computing device.

In FIG. 1B, a physical location 130 includes a single user 102E participating in the virtual meeting with the users 102A, 102B, and 102C at the location 100, as well as with other users at other locations, all of which are remote users to the user 102E. The user 102E can participate in the virtual meeting with remote users at other locations via a laptop or notebook computer 132 and headphones 134. The computer 132 includes a display, and either the computer 132 or the headphones 134 can include a microphone, or there may be an external microphone, by which the user 102E also participates in the virtual meeting. The user 102E is a remote user to the users 102A, 102B, and 102C at the location 100, as well as to other users at other locations.

In FIG. 1C, a physical location 160 includes a single user 102D participating in the virtual meeting with the users 102A, 102B, and 102C at the location 100, with the user 102E at the location 130, and potentially with other users at other locations, all of which are remote users to the user 102D. The users 102A, 102B, 102C, 102D, and 102E may be collectively referred to as the users 102. The user 102D can participate in the virtual meeting with remote users at other locations via a head-mountable display (HMD) 162 including headphones 164. The HMD 162 includes a camera and an internal display, and either the HMD 162 or the headphones 164 can include a microphone, or there may be an external microphone, by which the user 102D also participates in the virtual meeting. The user 102D is a remote user to the users 102A, 102B, and 102D at the location 100 and to the user 102E at the location 130, as well as to other users at other locations.

FIGS. 2A, 2B, 2C, and 2D are diagrams of different examples by which avatars representing the users 102 participating in the virtual meeting may be displayed at different physical locations 100, 130, and 160 depending on how the local users 102 are participating in the virtual meeting at these locations 100, 130, and 160. However, in each example, the avatars 202 are displayed in a spatial configuration and at orientations according to the focus of attention of each user 102. Therefore, cognitive fatigue resulting from user participation in the virtual meeting can be reduced, because the focus of attention of each user 102 is readily apparent.

In the examples, the focus of attention of the user 102A at the location 100 is the user 102D at the location 160. The focus of attention of the user 102B at the location 100 is the user 102E at the location 130. The focus of attention of the user 102C at the location 100 is a slide 210B of a presentation being displayed in the virtual meeting. The focus of attention of the user 102E at the location 130 is the user 102B at the location 100. The focus of attention of the user 102D at the location 160 is the user 102E at the location 130.

Figures 2A, 2B:
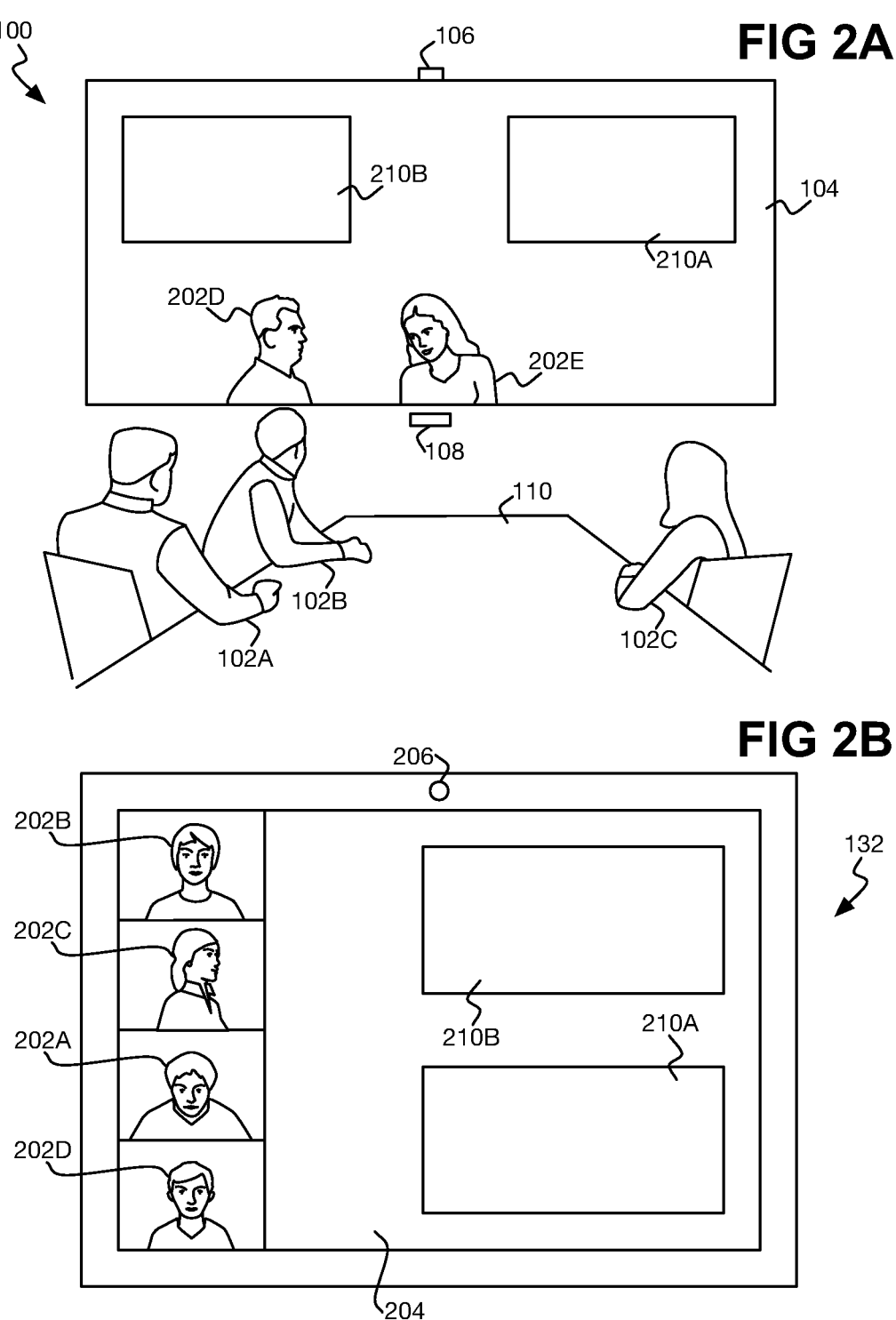
FIGS. 2A, 2B, 2C, and 2D are diagrams of different examples by which avatars representing remote users participating in a virtual meeting may be displayed at different physical locations depending on how the local users are participating in the virtual meeting at the locations.

The example of FIG. 2A corresponds to the physical location 100 of FIG. 1A. The users 102A, 102B, and 102C at the physical location 100 participate in the virtual meeting with the users 102D and 102E at the locations 130 and 160, respectively, via the display 104, the camera 106, the speaker 108, and a microphone, as noted. The presentation that is being displayed in the virtual meeting is displayed on the display 104, and includes the slide 210A as well as the slide 210B, which are collectively referred to as the slides 210. Also as part of the virtual meeting, avatars 202D and 202E respectively representing the users 102D and 102E that are remote to the users 102A, 102B, and 102C are displayed on the display 104 as part of the virtual meeting.

An avatar is a graphical representation of a user or the user's persona, may be in three-dimensional (3D) form, and may have varying degrees of realism, from cartoonish to nearly lifelike. An avatar may have a facial expression in correspondence with the facial expression that the user is currently exhibiting. The facial features of an avatar may move in synchronization with lip facial feature movement of the user as well as with the speech that the user is uttering.

In the example of FIG. 2A, the avatars 202D and 202E are displayed in a spatial configuration in which the avatar 202D is displayed at a display location to the left of the display location at which the avatar 202E is displayed, at the bottom of the display 104. Each avatar 202D and 202E is further displayed at a respective orientation in the spatial configuration. The spatial configuration of the avatars 202D and 202E is identified according to the focuses of attention of the users 102, and the orientation of each avatar 202D and 202E is identified according to the identified spatial configuration as well as according to the focuses of attention of the users 102.

Because the focus of attention of the user 102E that is remote to the physical location 100 is the user 102B that is local to the physical location 100, the orientation of the avatar 202E representing the user 102E is outwardly directed from the display 104 towards the physical location of the user 102E in front of the display 104. By comparison, because the focus of attention of the user 102D that is remote to the physical location 100 is the user 102E that is also remote to the physical location 100, and because the avatar 202D representing the user 102D is to the left of the avatar 202E, the orientation of the avatar 202D is directed rightward towards the avatar 202E. Therefore, the users 102A, 102B, and 102C that are local to the location 100 are able to discern the focuses of attention of the users 102D and 102E that are remote, via the spatial configuration and orientations of the avatars 202D and 202E.

The example of FIG. 2B corresponds to the physical location 130 of FIG. 1B. The user 102E at the physical location 130 participates in the virtual meeting with the users 102A, 102B, and 102C at the physical location 100 and with the user 102D at the physical location 160 via the computer 132, a camera 206, the headphones 134, and a microphone. The presentation that is displayed in the virtual meeting is displayed on a display 204 of the computer 132, and includes the slides 210. Also as part of the virtual meeting, avatars 202A, 202B, 202C, and 202D respectively representing the users 102A, 102B, 102C, and 102D that are remote to the user 102E are displayed on the display 204 as part of the virtual meeting.

In the example of FIG. 2B, the avatars 202A, 202B, and 202C, and 202D are displayed in a spatial configuration at respective display locations from top to bottom on the left side of the display 204. Each avatar 202A, 202B, 202C, and 202D is further displayed at a respective orientation in the spatial configuration. The spatial configuration of the avatars 202A, 202B, 202C, and 202D is identified according to the focuses of attention of the users 102, and the display locations of the avatars 202A, 202B, and 202C in the spatial configuration are independent of the physical spatial configuration of the corresponding users 102A, 102B, and 102C at the physical location 100. The orientation of each avatar 202A, 202B, 202C, and 202D is identified according to the identified spatial configuration as well as according to the focuses of attention of the users 102.

Because the focus of attention of each of the users 102B and 102D is the user 102E local to the physical location 130, the orientation of each of the avatars 202B and 202D is outwardly directed from the display 204 towards the user 102E facing the display 204. Because the focus of attention of the user 102A is another remote user, the user 102D, the orientation of the avatar 202A is directed downwards towards the avatar 202D. Because the focus of attention of the user 102C is the slide 210B, the orientation of the avatar 202C is directed rightwards towards the slide 210B as displayed on the display 204. Therefore, the user 102E is able to discern the focuses of attention of the users 102A, 102B, 102C, and 102D that are remote, via the spatial configuration and orientations of the avatars 202B, 202C, and 202D.

Figure 2C:
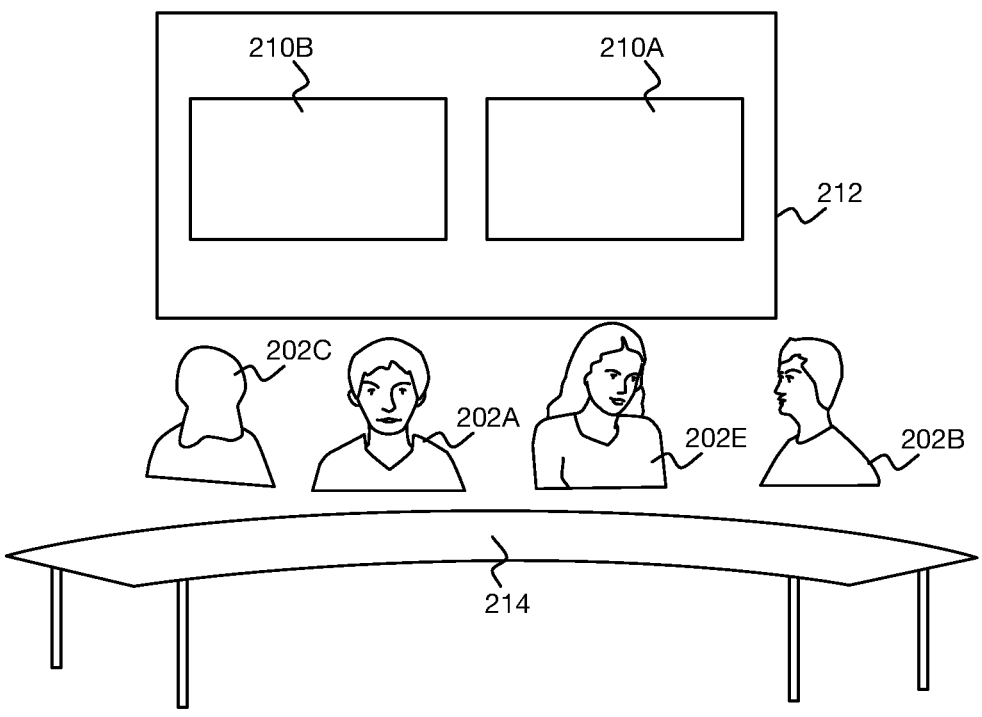
Figure 2D:
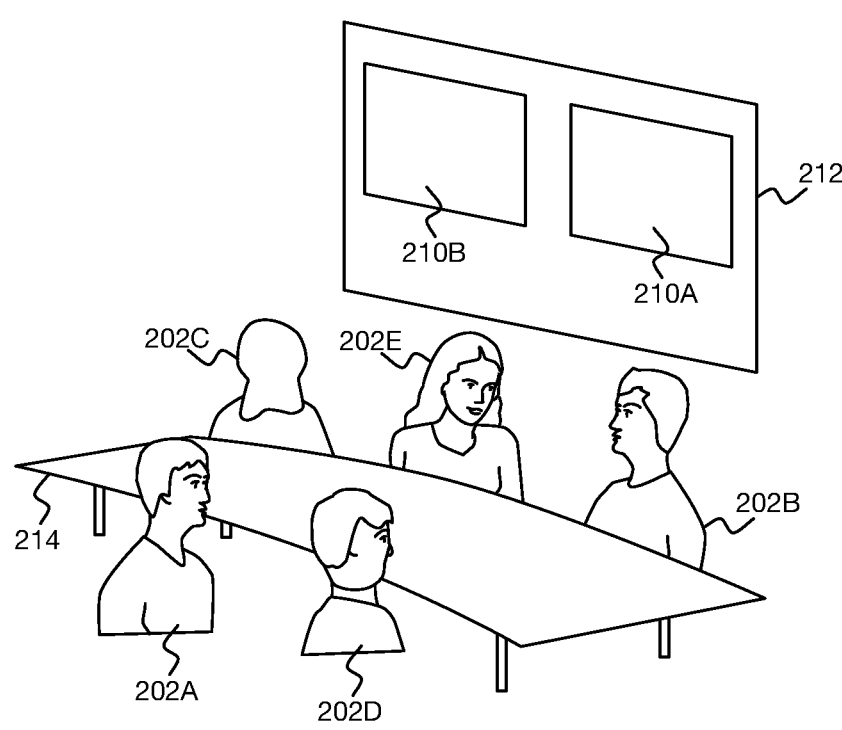

The examples of FIGS. 2C and 2D correspond to the physical location 160 of FIG. 1C. The user 102D at the physical location 160 participates in the virtual meeting with the users 102A, 102B, and 102C at the physical location 100 and the user 102E at the physical location 130 via the HMD 162 having the internal display and a camera, the headphones 164, and a microphone. FIG. 2C shows an extended reality (XR) environment displayed on the internal display of the HMD 162 to virtually immerse the user 102D within the virtual meeting from the perspective of the user 102D (i.e., a first-person perspective). FIG. 2D shows a third-person XR environment displayed on the internal display of the HMD 162 to virtually immerse the user 102D within the virtual meeting from a third-person perspective.

The presentation that is displayed in the virtual meeting on a virtual display 212 is displayed as part of both the first-person perspective XR environment of FIG. 2C and the third-person perspective XR environment of FIG. 2D, including the slides 210. In the XR environments of both FIGS. 2C and 2D, avatars 202A, 202B, 202C, and 202E respectively representing the users 102A, 102B, 102C and 102E that are remote to the user 102D are displayed. In the XR environment of FIG. 2D, the avatar 202D representing the user 102D that is local to the physical location 160 is also displayed, since the XR environment of FIG. 2D is from a third-person perspective.

In the example of FIG. 2C, the avatars 202A, 202B, 202C, and 202E are displayed in a spatial configuration at respective display locations around a virtual or real table 214 within the first-person perspective XR environment. Each avatar 202A, 202B, 202C, and 202E is further displayed in a respective orientation in the spatial configuration. The spatial configuration of the avatars 202A, 202B, 202C, and 202E is identified according to the focuses of attention of the users 102, and the display locations of the avatars 202A, 202B, and 202C in the spatial configuration are independent of the physical spatial configuration of the corresponding users 102A, 102B, and 102C at the physical location 100. The orientation of each avatar 202A, 202B, 202C, and 202E is identified according to the identified spatial configuration as well as according to the focuses of attention of the users 102.

Because the focus of attention of the user 102A is the user 102D local to the physical location, the orientation of the avatar 202A is outwardly directed from the internal display of the HMD 162 towards the eyes of the user 102D wearing the HMD 162. Because the focuses of attention of the users 102B and 102E are each other, the orientation of the avatar 202B is directed leftwards towards the avatar 202E and the orientation of the avatar 202E is directed rightwards towards the avatar 202B. Because the focus of attention of the user 102C is the slide 210B, the orientation of the avatar 202C is directed towards the slide 210B, facing away from the first-person perspective XR environment of FIG. 2C (i.e., directed away from the eyes of the user 102D wearing the HMD 162). Therefore, the user 102D is able to discern the focuses of attention of the users 102A, 102B, 102C, and 102E that are remote, via the spatial configuration and orientation of the avatars 202A, 202B, 202C, and 202D.

In the example of FIG. 2D, the avatars 202A, 202B, 202C, 202D, and 202E, which are collectively referred to as the avatars 202, are displayed in a spatial configuration at respective display locations around a virtual or real table 214 within the third-person perspective XR environment. Each avatar 202 is further displayed in a respective orientation in the spatial configuration. The spatial configuration of the avatars 202 is identified according to the focuses of attention of the users 102, and the display locations of the avatars 202A, 202B, and 202C in the spatial configuration are independent of the physical spatial configuration of the corresponding users 102A, 102B, and 102C at the physical location 100. The orientation of each avatar 202 is identified according to the identified spatial configuration as well as according to the focuses of attention of the users 102.

Because the focus of attention of the user 102A is the user 102D, the orientation of the avatar 202A is directed rightwards towards the avatar 202D. Because the focus of attention of the user 102B is the user 102E, the orientation of the avatar 202B is directly leftwards towards the avatar 202E. Because the focuses of attention of the users 102D and 102E are the user 102B, the orientation of the avatar 202D is across the table towards the avatar 202B and the orientation of the avatar 202E is rightwards towards the avatar 202B. Because the focus of attention of the user 102C is the slide 210B, the orientation of the avatar 202C is directed towards the slide 210B and thus facing away from the third-person perspective XR environment of FIG. 2D. Therefore, the user 102D is able to discern the focuses of attention of the users 102A, 102B, 102C, and 102E that are remote, via the spatial configuration and orientation of the avatars 202A, 202B, 202C, and 202E.

FIG. 3 shows an example non-transitory computer-readable data storage medium 300 storing program code 302. The program code 302 is executable by a processor of a device at each physical location 100, 130, and 160 to perform a method 304, which may also be referred to as processing. The method 304 is for displaying avatars 202 representing users 102 participating in a virtual meeting in a spatial configuration and at orientations according to the focus of attention of each user 102.

For example, the meeting device at the physical location 100 executes the program code 302 to display the avatars 202D and 202E respectively representing the users 102D and 102E that are remote to the location 100. The computer 132 at the physical location 130 executes the program code 302 to display the avatars 202A, 202B, 202C, and 202D respectively representing the users 102A, 102B, 102C, and 102D that are remote to the location 130. The HMD 162 at the physical location 160—or a host computing device to which the HMD 162 is connected—executes the program code 302 to display the avatars 202A, 202B, 202C, and 202E respectively representing the users 102A, 102B, 102C, and 102E that are remote to the location 160. The HMD 162 or the host device may execute the program code 302 to also display the avatar 202D representing the user 102D that is local to the physical location 160 and who is wearing the HMD 162.

The method 304 includes identifying the focus of attention of each local user 102 at the location 100, 130, or 160 in question (306), and is sent to the computing devices at the other of the locations 100, 130, and 160 (308). For example, at the location 100, the focuses of attention of the local users 102A, 102B, and 102C are determined, and are sent to the computer 132 at the location 130 and to the HMD 162 (or to a host device) at the location 160. At the location 130, the focus of attention of the local user 102E is determined, and is sent to the meeting device at the location 100 and to the HMD 162 (or to a host device) at the location 160. At the location 160, the focus of attention of the local user 102D is determined, and is sent to the meeting device at the location 100 and to the computer 132 at the location 130.

The focus of attention of a local user 102 can be determined in a variety of different ways. The focus of attention of a local user 102 can be determined according to or based on the gaze of the user 102, which may be identified using eye-tracking cameras, for instance. The focus of attention of a local user 102 may be determined based on other information as well, such as the identified facial expression of the user 102, the identified body language of the user 102, the direction in which the face, head, and/or body of the user 102 is facing, and so on. This additional information may also be determined from images captured by cameras, as well as by using sensors, and so on.

The method 304 includes receiving the focus of attention of each remote user 102 participating in the virtual meeting with the local user or users 102 at the location 100, 130, or 160 in question, from the computing devices at the locations 100, 130, and 160 of the remote users 102 (310). At the location 100, the focus of attention of the remote user 102E is received from the computer 132 at the location 130, and the focus of attention of the remote user 102D is received from the HMD 162 (or from a host device) at the location 160. At the location 130, the focuses of attention of the remote users 102A, 102B, and 102C are received from the meeting device at the location 100, and the focus of attention of the remote user 102D is received from the HMD 162 (or from a host device) at the location 160. At the location 160, the focuses of attention of the remote users 102A, 102B, and 102C are received from the meeting device at the location 100, and the focus of attention of the remote user 102E is received from the computer 132 at the location 130.

The method 304 includes identifying the spatial configuration of the avatars 202 representing the users 102 that are remote to the location 100, 130, or 160 in question (312). At the location 160, the spatial configuration that is identified may also include the avatar 202D representing the local user 102D in the case in which the XR environment by which the virtual meeting is displayed is a third-person perspective such environment. The spatial configuration of the avatars 202 is identified according to the focuses of attention of the users 102, such as those users 102 that are remote to the location 100, 130, or 160 in question. One way by which the spatial configuration of the avatars 202 can be identified is described later in the detailed description. In general, the spatial configuration of the avatars 202 at a given location 100, 130, or 160 is the spatial configuration of how the avatars 202 will be displayed at the location 100, 130, or 160 in question as part of the virtual meeting, and includes the display location of each such avatar 202 relative to the other avatars 202 that are to be displayed.

The method 304 also includes identifying the orientation of the avatar 202 representing each user 102 that is remote to the location 100, 130, or 160 in question in the identified spatial configuration (314). At the location 160, the orientation of the avatar 202D representing the local user 102D may also be identified in the case in which the XR environment by which the virtual meeting is displayed is a third-person perspective such information. The orientation of the avatar 202 representing a user 102 is identified according to the already identified spatial configuration of the avatars 202, as well as according to the focus of attention of that user 102. One way by which the orientation of the avatar 202 representing each user 102 in an identified spatial configuration can be identified is described later in the detailed description. In general, the orientation of the avatar 202 representing a user 102 is the orientation of the avatar 202 as will be displayed at the location 100, 130, or 160 in question as part of the virtual meeting.

At the location 100, the spatial configuration and the orientations of the avatars 202D and 202E representing the remote users 102D and 102E are identified. At the location 130, the spatial configuration and the orientations of the avatars 202A, 202B, 202C, and 202D representing the remote users 102A, 102B, 102C, and 102D are identified. At the location 160, the spatial configuration and the orientations of the avatars 202A, 202B, 202C, and 202E representing the remote users 102A, 102B, 102C, and 102E are identified. At the location 160, the spatial configuration that is identified can also include the avatar 202D representing the user 102D, and the orientation of the avatar 202D may also be identified.

The method 304 can include displaying at each location 100, 130, or 160 the presentation that is being referenced during the virtual meeting, including one or multiple current slides 210 (316). The slide or slides 210 displayed at each location 100, 130, or 160 may differ or be the same. That is, the display of the slides 210 may or may not be synchronized across the locations 100, 130, or 160. The method 304 includes displaying at each location 100, 130, or 160 the avatars 202 of the users 102 who are remote to that location, in the identified configuration and at the identified orientations (318), examples of which have been described in relation to FIGS. 2A, 2B, 2C, and 2D.

FIG. 4 shows an example method 400 for identifying at a location 100, 130, or 160 the spatial configuration of the avatars 202 representing the users 102 who are remote to that location. The method 400 can be implemented as program code stored on a non-transitory computer-readable data storage medium and executed by a device, such as the meeting device at the location 100, the computer 132 at the location 130, or the HMD 162 or host device at the location 160. The method 400 can be used to implement part 312 of the method 304.

A current remote user 102 is set to the first remote user 102 (402), where the users 102 that are remote to a given location 100, 130, or 160 can be ordered in any order. (For the purposes of the method 400, the user 102D is considered a remote user at the location 160 if the XR environment is from a third-person perspective, since in such an environment the user 102D is technically a remote user). The method 400 can include determining whether the display location of the avatar 202 representing another remote user 102 having as his or her focus of attention the current remote user 102 has already been set in the spatial configuration (404). The method 400 can similarly include determining whether the display location of the avatar 202 representing another remote user 102 who is the focus of attention of the current remote user 102 has already been set in the spatial configuration (406). The display location of an avatar 202 representing another remote user 102 is already set if this other remote user has already been processed in the method 400 as a current remote user 102.

In either such case, the display location of the avatar 202 representing the current remote user 102 is set according to the display location of the other remote user 102 in question (408). For example, the display location of the avatar 202 representing the current remote user 102 may be set in the spatial configuration as immediately or otherwise adjacent to the display location of avatar 202 representing any other remote user 102 that is the focus of attention of the current remote user 102 or of which the focus of attention is the current remote user 102. The display location of the avatar 202 representing the current remote user 102 may be set in this manner regardless if the method 400 is being performed for the location 100, 130, or 160.

However, if the focus of attention of the current remote user 102 is the presentation, such as a slide 210 of the presentation (410), then the display location of the avatar 202 representing the current remote user 102 is set according to the display location of the slide 210 in question (412). For example, the display location of the current remote user 102 may be set adjacent to the slide 210 as will be displayed in the spatial configuration at the location 100, 130, or 160 in question. The display location of the avatar 202 representing the current remote user 102 may also be set in this manner regardless if the method 400 is being performed for the location 100, 130, or 160.

If the focus of attention of the current remote user 102 is not another remote user 102 or the presentation, however, then the display location of the avatar 202 representing the current remote user 102 may be set without constraint as to the display locations of the avatars 202 of other remote users 102 that have already been set (414). That is, the display location of the avatar 202 in the identified spatial configuration may not matter, and therefore may be randomly or otherwise specified. The display location of the avatar 202 representing the current remote user 102 may be set in this manner regardless if the method 400 is being performed for the location 100, 130, or 160.

If the current remote user 102 is not the last remote user 102 (416)—that is, if not all the remote users 102 have had their display locations set—then the current remote user 102 is advanced to the next remote user 102 (418), and the method is repeated at part 404. Once all the remote users 102 have been processed, the method 400 is finished (420), such that the spatial configuration of the avatars 202 representing the remote users 102 has been identified. It is noted that the spatial configuration can be identified in ways other than that which have been described. For instance, once the display location of the avatar 202 representing a remote user 102 has been set, the location may be subsequently adjusted when the display location of the avatar 202 representing another remote user 102 is being set, for aesthetic and other reasons.

FIG. 5 shows an example method 500 for identifying at a location 100, 130, or 160 the orientations of the avatars 202 representing the users 102 who are remote to that location, within the spatial configuration that has been identified. The method 500 can be implemented as program code stored on a non-transitory computer-readable data storage medium and executed by a device, such as the meeting device at the location 100, the computer 132 at the location 130, or the HMD 162 or host device at the location 160. The method 500 can be used to implement part 314 of the method 304.

A current remote user 102 is set to the first remote user 102 (502). (As in the method 400, for the purposes of the method 500, the user 102D is considered a remote user at the location 160 if the XR environment is from a third-person perspective.) If the focus of attention of the current remote user 102 is a local user 102 at the location 100, 130, or 160 in question, then the orientation of the avatar 202 representing the current remote user 102 may be set outwards towards the local user 102 (504). At the location 100, for instance, the orientation of the avatar 202 representing such a current remote user 102 is outwardly directed towards the physical location of the local user 102A, 102B, or 102C in question. At the location 130, the orientation of the avatar 202 is outwardly directed from the display 204 towards the local user 102E facing the display 204. At the location 160, the orientation of the avatar 202 is outwardly directed from the internal display of the HMD 162 towards the eyes of the local user 102D wearing the HMD 162.

If the focus of attention of the current remote user 102 is another user 102 that is remote to the location 100, 130, or 160 in question, then the orientation of the avatar 202 representing the current remote user 102 is set as directed towards the avatar 202 representing the other remote user 102 in question in the spatial configuration (506). That is, the orientation of the avatar 202 representing the current remote user 102 is directed from the display location of this avatar 202 towards the display location of the avatar 202 representing the other remote user 102 in question in the spatial configuration. If the focus of attention of the current remote user 102 is the presentation, such as a slide 210 thereof, then the orientation of the avatar 202 representing the current remote user 102 is set as directed towards the presentation, such as the slide 210 in question, in the spatial configuration (508).

If the current remote user 102 is not the last remote user 102 (510), such that the avatars 202 for all the remote users 102 have not yet had their orientations in the spatial configuration set, then the current remote user 102 is advanced to the next remote user 102 (512), and the method 500 repeated at part 504. Once the avatars 202 for all the remote users 102 have had their orientations set, then the method 500 is finished (514). It is noted that the orientations of the avatars 202 can be set in the spatial configuration in ways other than that which have been described. For instance, a remote user 102 may have as his or her focus of attention something other another user 102 or the presentation, in which case the orientation of the avatar 202 representing this remote user 102 can be set accordingly.

Figure 6:
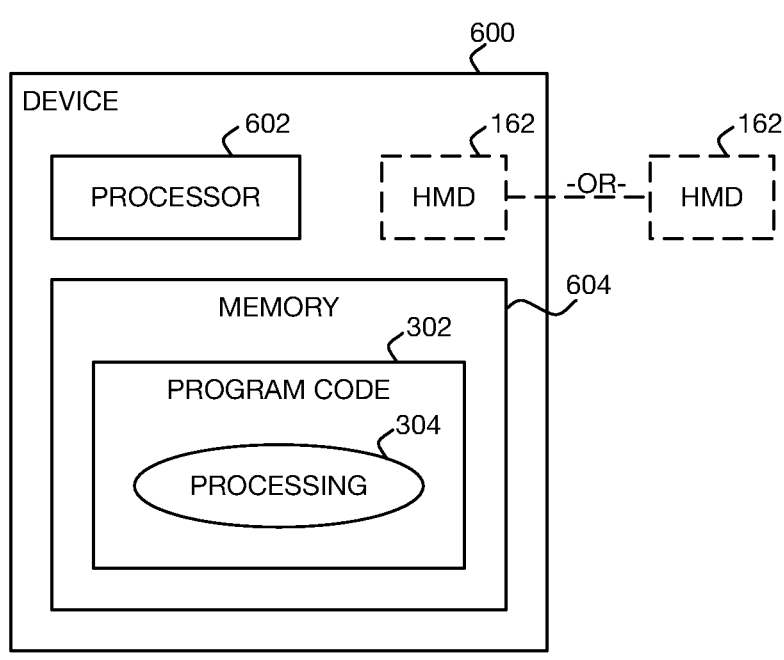
FIG. 6 is a block diagram of an example electronic device for displaying avatars representing remote users participating in a virtual meeting in a spatial configuration and at orientations according to the focus of attention of each user, and which may include a head-mountable display (HMD).

FIG. 6 shows an example electronic device 600. The electronic device 600 may be in the form of or include a computing device. The electronic device 600 can be or include the meeting device at the physical location 100 or the computer 132 at the physical location 130. As to the physical location 160, the electronic device 600 can be or include the HMD 162, in which case the HMD 162 is considered part of the device 600, or can be or include the host device to which the HMD 162 is communicatively connected, in which case the HMD 162 is not considered part of the device 600. This is why the HMD 162 is depicted with dashed lines in the figure. The electronic device 600 includes a processor 602 and a memory 604 storing the program code 302 that the processor 602 executes to perform the method or processing 304 that has been described. The electronic device 600 can also include other hardware and software components, in addition to those depicted.

Techniques have been described for displaying avatars 202 representing users 102 who are remote to other users 102 at a given location 100, 130, or 160, and that all of which are participating in a virtual meeting. The avatars 202 representing the remote users 102 are displayed in a spatial configuration and at orientations according to the focuses of attention of the users 102. Therefore, local users 102 at the location 100, 130, or 160 in question are less likely to experience cognitive fatigue while participating in the virtual meeting.

We claim:

1. A non-transitory computer-readable data storage medium storing program code executable by a computing device of a local user to perform processing comprising:

receiving from other computing devices a focus of attention of each of a plurality of remote users participating with the local user in a virtual meeting;

determining a focus of attention for the local user;

identifying a spatial configuration of avatars representing the remote users and the local user according to the focus of attention of each remote user and the local user;

identifying an orientation of each avatar in the identified spatial configuration according to the identified spatial configuration and according to the focus of attention of the remote user or the local user that the avatar represents; and displaying the avatars in the identified spatial configuration on a display, each avatar, including the avatars representing the remote users and the local user, displayed in the identified spatial configuration on the display at the identified orientation.

2. The non-transitory computer-readable data storage medium of claim 1, wherein the remote users comprise a given remote user, and the focus of attention of the given remote user is the local user, and wherein the identified orientation of the avatar representing the given remote user is outwardly directed from the display towards the local user facing the display.

3. The non-transitory computer-readable data storage medium of claim 1, wherein the remote users comprise a first remote user at a first physical location and a second remote user at a second physical location, and the focus of attention of the first remote user is the second remote user, wherein in the identified spatial configuration, the avatar representing the first remote user is at first display location adjacent to a second display location at which the avatar representing the second remote user is in the identified spatial configuration, and wherein the identified orientation of the avatar representing the first remote user is directed from the first display location to the second display location.

4. The non-transitory computer-readable data storage medium of claim 1, wherein the remote users comprise a first remote user and a second remote user at a given physical location, the first and second remote users having a physical spatial configuration at the given physical location, wherein in the identified spatial configuration, the avatar representing the first remote user is at a first display location and the avatar representing the second remote user is at a second display location, the first and second display locations independent of the physical spatial configuration of the first and second remote users at the given physical location.

5. The non-transitory computer-readable data storage medium of claim 1, wherein identifying the spatial configuration of the avatars representing the remote users according to the focus of attention of each remote user comprises:

for each remote user, setting a display location of the avatar representing the remote user in the identified spatial configuration immediately adjacent to the avatar representing any other remote user that is the focus of attention of the remote user or of which the focus of attention is the remote user.

6. The non-transitory computer-readable data storage medium of claim 5, wherein identifying the orientation of each avatar in the identified spatial configuration according to the identified configuration and according to the focus of the remote user that the avatar represents comprises:

if the focus of attention of the remote user is the local user, setting the orientation of the avatar representing the remote user as outwardly directed from the display towards the local user facing the display; and if the focus of attention of the remote user is a different remote user, setting the orientation of the avatar representing the remote user as directed from the display location of the avatar representing the remote user towards the display location of the avatar representing the different remote user.

7. A method comprising:

receiving, by a computing device of a plurality of local users and from other computing devices, a focus of attention of each of a plurality of remote users participating with the local user in a virtual meeting;

determining, by the computing device, a focus of attention of the local user;

identifying, by the computing device, a spatial configuration of avatars representing the remote users and the local user according to the focus of attention of each remote user and the local user;

identifying, by the computing device, an orientation of each avatar in the identified spatial configuration according to the identified spatial configuration and according to the focus of attention of the remote user or the local user that the avatar represents; and displaying, by the computing device, the avatars in the identified spatial configuration on a display, each avatar, including the avatars representing the remote users and the avatar representing the local user, displayed in the identified spatial configuration on the display at the identified orientation.

8. The method of claim 7, wherein the local users comprise a given local user, the remote users comprise a given remote user, and the focus of the given remote user is the given local user, and wherein the identified orientation of the avatar representing the given remote user is outwardly directed from the display towards a physical location of the given local user in front of the display.

9. The method of claim 7, wherein the remote users comprise a first remote user at a first physical location and a second remote user at a second physical location, and the focus of attention of the first remote user is the second remote user, wherein in the identified spatial configuration, the avatar representing the first remote user is at a first display location adjacent to a second display location at which the avatar representing the second remote user is in the identified spatial configuration.

10. The method of claim 7, wherein identifying the spatial configuration of the avatars representing the remote users according to the focus of attention of each remote user comprises:

for each remote user, setting a display location of the avatar representing the remote user in the identified spatial configuration adjacent to the avatar representing any other remote user that is the focus of attention of the remote user or of which the focus of attention is the remote user.

11. The method of claim 10, wherein identifying the orientation of each avatar in the identified spatial configuration according to the identified configuration and according to the focus of the remote user that the avatar represents comprises:

if the focus of orientation of the remote user is one of the local users, setting the orientation of the avatar representing the remote user as outwardly directed from the display towards a physical location of the one the local users in front of the display; and if the focus of orientation of the remote user is a different remote user, setting the orientation of the avatar representing the remote user as directed from the display location of the avatar representing the remote user towards the display location of the avatar representing the different remote user.

12. An electronic device of a local user that is to wear a head-mountable display (HMD) comprising:

a processor; and a memory storing program code executable by the processor to:

determine a focus of attention of the local user;

receive from other computing devices a focus of attention of each of a plurality of remote users participating with the local user in a virtual meeting;

identify a spatial configuration of avatars representing the remote users and the local user according to the focus of attention of the local user and of each remote user;

identify an orientation of each avatar in the identified spatial configuration according to the identified spatial configuration and according to the focus of attention of the remote user or the local user that the avatar represents; and display the avatars in the identified spatial configuration within an extended reality (XR) environment on the HMD, each avatar displayed in the identified spatial configuration within the XR environment on the HMD at the identified orientation, wherein the XR environment comprises a third-person perspective XR environment.

13. The electronic device of claim 12, wherein the XR environment comprises a first-person perspective XR environment.

14. The electronic device of claim 12, further comprising the HMD.

15. The non-transitory computer-readable data storage medium of claim 1, wherein the focus of attention of the local user is determined according to a gaze of the local user, wherein the gaze is identified using eye-tracking cameras.

* * * * *